Aug. 27, 1935.                    C. W. MANZEL                    2,012,724
                        CENTRALIZED LUBRICATING SYSTEM
                            Filed Aug. 21, 1928           4 Sheets-Sheet 1
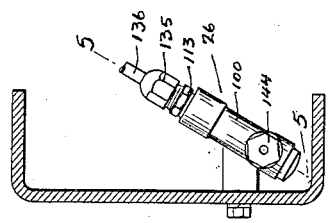
Fig. 2.
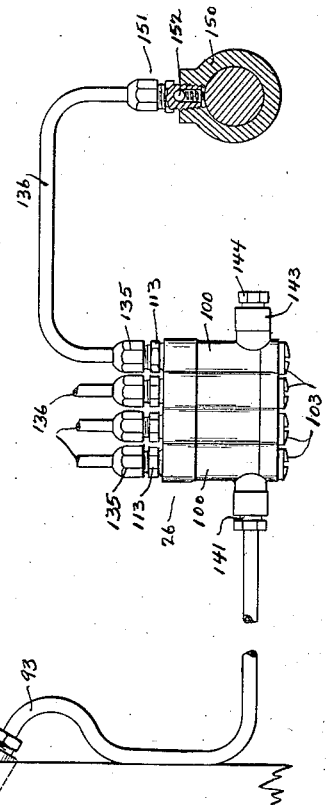
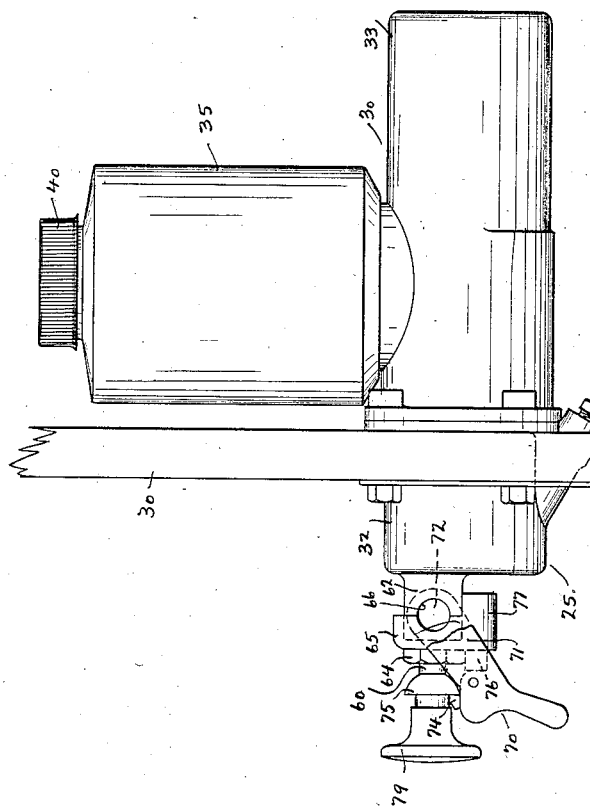
Fig. 1.
Charles W. Manzel INVENTOR
By J.W.M Ellis
ATTORNEY Aug. 27, 1935.   C. W. MANZEL   2,012,724
CENTRALIZED LUBRICATING SYSTEM
Filed Aug. 21, 1928   4 Sheets-Sheet 2
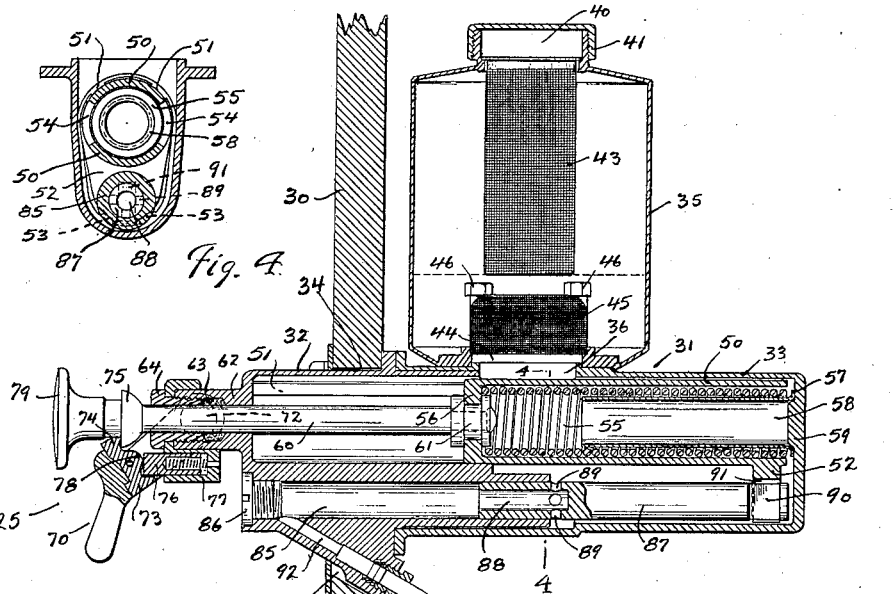

Aug. 27, 1935.  C. W. MANZEL  2,012,724
CENTRALIZED LUBRICATING SYSTEM
Filed Aug. 21, 1928  4 Sheets-Sheet 3
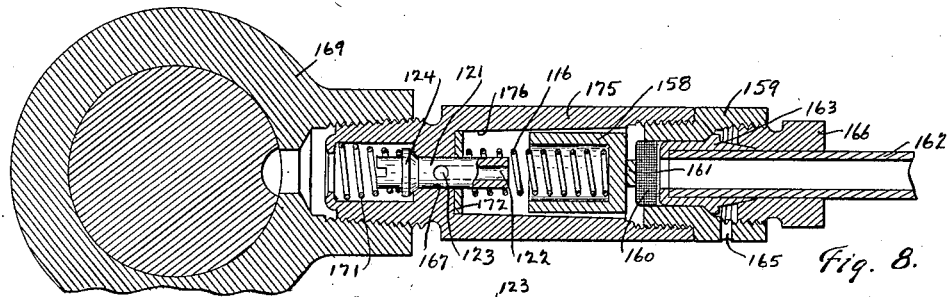
Fig. 8.
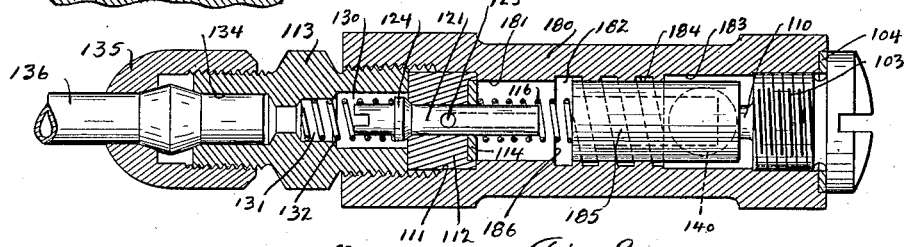
Fig. 9.
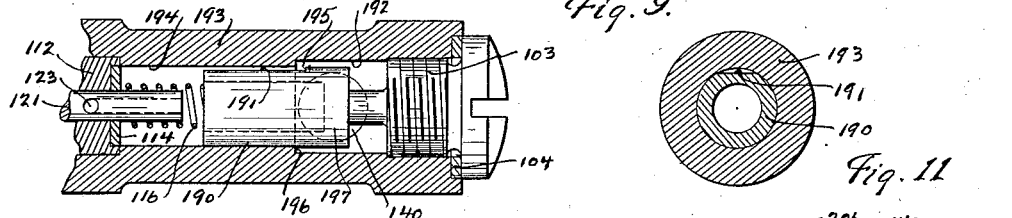
Fig. 10.
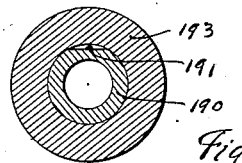
Fig. 11.
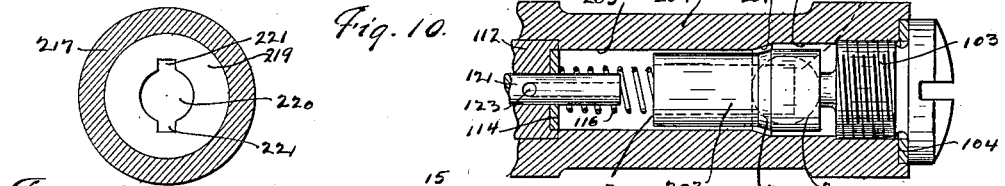
Fig. 12.
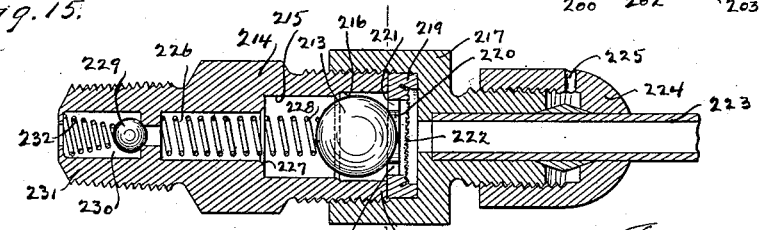
Fig. 14.
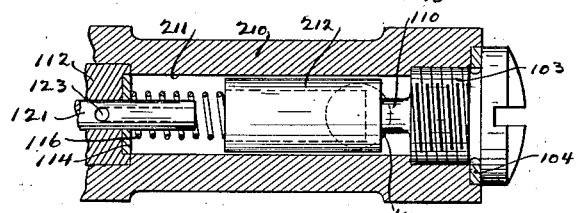
Fig. 23.
Fig. 15.
INVENTOR
Charles W. Manzel
BY J. Wm Ellis
ATTORNEY Patented Aug. 27, 1935

2,012,724

UNITED STATES PATENT OFFICE 2,012,724

CENTRALIZED LUBRICATING SYSTEM

Charles W. Manzel, Buffalo, N. Y.

Application August 21, 1928, Serial No. 301,062

8 Claims. (Cl. 184—7)

My invention relates in general to lubricating systems, and in particular to that type of system where a single pump serves to force lubrication to various machinery bearings.

The principal object of my invention has been to provide a system sealed against air pockets, and one which shall be solidly filled with lubricant, whereby the quantity of lubricant discharged from the system to each of the bearings lubricated may be accurately gauged.

Another object has been to provide measuring units for such a system having positive check valves, thus substantially obviating the possibility of any of the lubricant being drawn back into the system from the bearing due to the vacuum created by the moving parts as they return to their normal positions.

Another object has been to provide a pump for such a system, all parts of which shall be submerged in the lubricant of the system at all times.

Moreover, it has been an object to provide means for operating the pump which shall be arranged horizontally and located in the lubricant of the system, whereby such means may be efficiently sealed against the admission of air into the system.

Furthermore, it has been an object to provide a pump which shall be practically automatic in operation, so that when its operation is initiated, it will feed lubricant to the measuring units and bearings independently of manual operation, and without regard to the viscosity of the lubricant used, due either to the grade of lubricant or temperature under which the device is operated.

The above objects and advantages have been accomplished by the device shown in the accompanying drawings, of which:

Fig. 1 is an exterior view of one form of my lubricating system.

Fig. 2 is a side elevation of a multiple measuring unit of my system showing it attached to the frame of an automobile.

Fig. 3 is a longitudinal, sectional, elevation of one form of pump unit used in my system.

Fig. 4 is a sectional elevation of the pump of Fig. 3, and is taken on line 4—4 of Fig. 3.

Fig. 5 is an enlarged, fragmentary, sectional view of one of the measuring units and is taken on line 5—5 of Fig. 2.

Fig. 6 is an enlarged, longitudinal, sectional view of a single measuring unit.

Fig. 7 is a transverse, sectional elevation of the form of Fig. 6 and is taken on line 7—7 thereof.

Fig. 8 is an enlarged, longitudinal, sectional view of a slight modification of the form of measuring unit shown in Fig. 6.

Figures 16, 17:
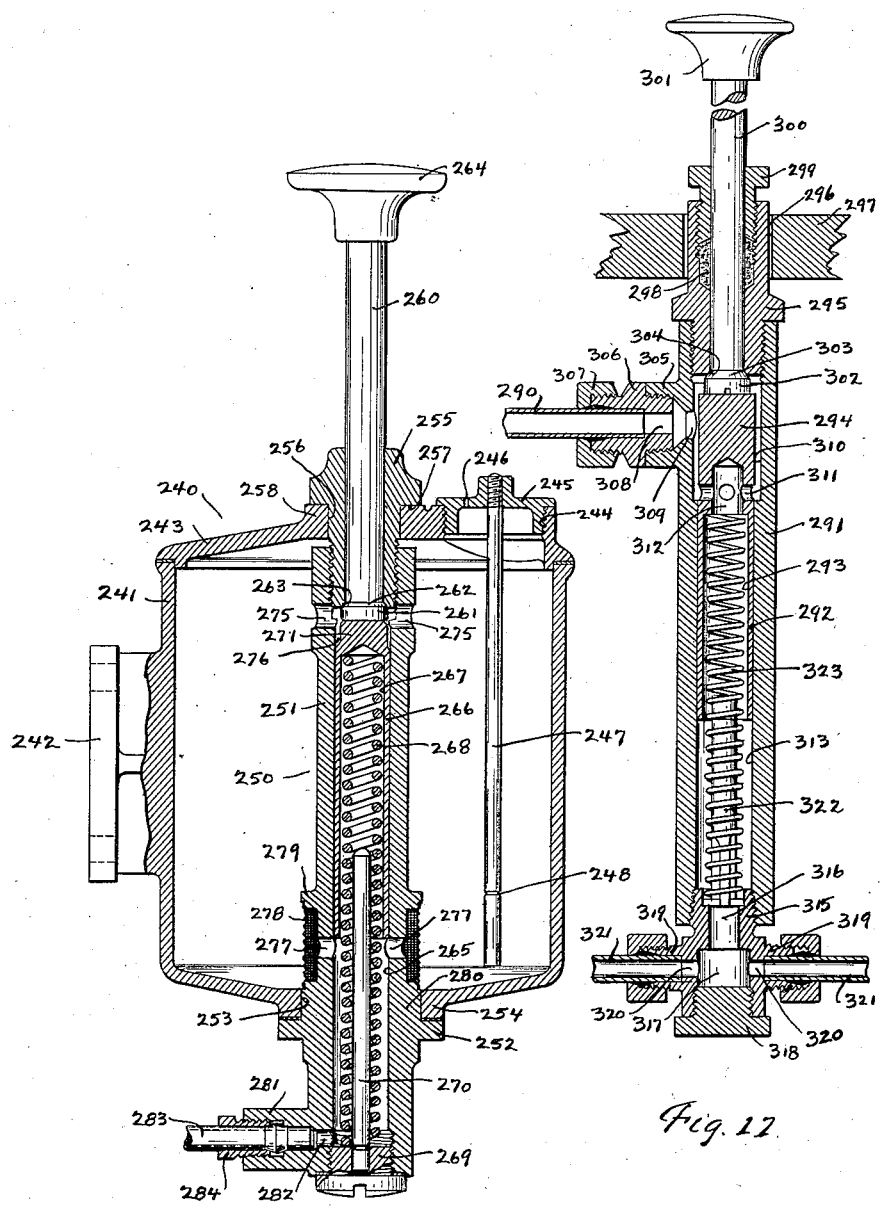

Figs. 9 to 15, inclusive, show various modifications of measuring units.

Fig. 16 is a longitudinal, sectional elevation of a modified form of pump unit.

Fig. 17 is a longitudinal, sectional view of another modified form of pump.

Referring now to the form of device shown in Figs. 1 to 5, inclusive, my device comprises in general a pump unit 25 and a measuring unit 26 which is supplied with lubricant under pressure from the pump unit, the measuring unit being connected to the bearings to be lubricated, as hereinafter described.

The form of invention shown in Figs. 1 to 5 is designed primarily for use upon an automobile or other vehicle, and the pump unit 25 thereof is carried by the vehicle engine dash board 30, with a portion of it projecting inwardly and disposed under the engine cowl (not shown) and a portion of it extending outwardly toward the operator and within easy reach of his foot or hand. This pump unit comprises a casing 31 comprising a front portion 32 and a rear portion 33. The front portion 32 is passed through a suitable aperture 34 formed in the dash board 30 and is secured to the dash by any suitable means. The rear portion of the casing engages with the front portion thereof and is secured to such portion by any suitable means. The casing 31 thus provides a lubricant chamber, and a lubricant reservoir 35 is carried by the rear portion 33 of the casing, and an opening 36 formed in the rear portion thereof serves to connect the reservoir with the chamber, thus assuring that the chamber will always be filled with lubricant. The reservoir is preferably cylindrical and provided in its top with a filler opening 40 which is closed by means of a screw-threaded cap 41. A strainer element 43 is removably supported by the filler opening 40, and extends down into the reservoir for a distance equal substantially to a point in the reservoir which when reached by the lubricant indicates the need of replenishment thereof. An opening 44 is provided in the bottom of the reservoir which is in registration with the opening 36 of the rear casing portion 33. A strainer element 45 is carried by the reservoir and secured over the opening 44. This strainer element is preferably finer in mesh than the strainer element 43 and serves to remove from the lubricant any sediment or foreign matter which might affect the operation of the measuring units. The reservoir is preferably secured to the rear casing portion 33 by means of bolts 46, whereby the reservoir may be removed for cleaning.

Carried in the upper part of the casing 31 is a pump cross-head 50 which is slidably disposed within the casing and preferably having bearing contact with ways 51 along its top surface. The cross-head is provided with a depending arm 52, formed on its rear end, which arm has bearing engagement with ways 53 formed in the lower part of the casing. The cross-head is tubular in form and is provided in its sides with longitudinal openings 54, whereby the lubricant from the reservoir shall not be restricted in its passage from the upper part of the casing to the lower part thereof. Mounted within the cross-head is a helical operating spring 55 which has its forward end bearing against the end 56 of the cross-head, and its other end bearing against the flange 57 of a tubular spring support 58, which in turn is supported by the rear head 59 of the casing.

The cross-head 50 carries an operating plunger 60 at its forward end, the rear end of which plunger is rotatably attached to the cross-head preferably by means of a sleeve 61, which engages the end 56 thereof. The operating plunger 60 passes through a boss 62 formed at the forward end of the casing, and through a stuffing box 63 carried by the boss. A stuffing box gland 64 is mounted upon the plunger and has screw-threaded engagement with the boss 62. Carried by the forward end of the boss 62, and held in place by means of the gland 64, is a trunnion block 65. A trunnion bearing 66 is formed in the boss 62 and the trunnion block 65 on diametrically opposite sides thereof, and one-half of this bearing is preferably formed in the boss, and the other half in the block (see Fig. 1). A release trigger 70 is provided for my device and is formed with an upwardly extending arm 71 at each side thereof. Each of these arms is provided with a trunnion 72 which engages with the trunnion bearing 66 formed at each side of the boss 62 and trunnion block 65, whereby the release trigger is pivotally mounted. The release trigger is preferably formed with a hardened insert 73, being formed at its upper end with a latch 74. The latch engages a latch lug 75 carried by the operating plunger 60, whereby when the plunger is forced inwardly, it will be maintained in such inward position by the engagement of the latch 74 with the latch lug 75. A spring-pressed plunger 76 is carried by a cylindrical lug 77 formed on the trunnion block 65. The outer end of this plunger engages with a circularly-shaped lug 78 formed on the hardened insert 73 of the trigger release whereby the release is held normally in the position shown in Figs. 1 and 2.

Arranged at the extreme forward end of the operating plunger 60 is a button 79 whereby the plunger may be depressed.

The pump unit 25 is provided with a pump cylinder 85 which is preferably made an integral part of the front casing portion 32. This cylinder is open at its rear end, which extends into the rear casing portion 33. The forward end of the cylinder is closed by a screw 86 which is properly packed to prevent leakage of the lubricant at this point. Mounted within the pump cylinder is a pump plunger 87. This plunger is so proportioned that its forward end is in engagement with the cylinder 85 when the plunger is in its normally retracted position. This end of the plunger is provided with a longitudinal passageway 88 and with a number of lateral ports 89. The lateral ports are formed through the wall of the plunger so that they are in communication with the longitudinal passageway 88 and they are so located as to be exposed to the interior of the casing when the plunger is in its retracted position as shown in Fig. 3. A slight inward movement of the plunger, therefore, serves to close the lateral ports 89. The rear end of the plunger is provided with a centrally arranged flattened portion 90 with which the cross-head arm 52 engages, the cross-head arm being formed with a slot 91 (see Figs. 3 and 4), whereby the plunger will be actuated when the cross-head is operated.

A discharge port 92 is in communication with the forward end of the pump cylinder 85, whereby the substantially maximum amount of lubricant contained within the cylinder may be discharged therefrom through the discharge port 92. To the lower end of this discharge port is attached the main supply pipe 93 of my device, which carries the lubricant under pressure to the measuring units, to be hereinafter described.

The measuring elements of my system are preferably formed en bloc as shown by the unit 26 in Fig. 1. However, if desired, these elements may be formed singly as shown in some of the other figures of the drawings, to be hereinafter described. While I have shown in Fig. 1 but one group of measuring units and one bearing being lubricated, it is obvious that this is simply for the purpose of clearness of illustration and that when more bearings are to be lubricated than can be conveniently accommodated by a unit having a certain number of elements, other units may be provided at convenient places where a group of closely located bearings are arranged.

Referring to the measuring element structures shown in Figs. 1 and 5, the body 100 is preferably of cast material and is provided with four measuring elements which form cylinders for each of the elements. Each of the cylinders in the preferred form of the invention, as shown in Fig. 5, is provided with a cylinder bore 101 which has an enlarged counterbore 102 near its inner end. A screw 103 having suitable packing 104 serves to close this end of the cylinder bore 101. Slidably mounted within the cylinder bore is a piston 105 formed with a spiral groove 106 in a portion of its length. This groove extends from the outer end of the piston to a reduced portion 107. This reduced portion thus forms a head 108 starting at the shoulder 109 and terminating at the inner end of the piston. A stop pin 110 is preferably carried by the screw 103 for limiting the inner or return movement of the piston. The head 108 of the piston is smaller in diameter and shorter in length than the diameter of the counterbore 102 and the length thereof, so that the cylinder or measuring chamber 101 will be normally open when the piston is in its normally retracted position, as shown in Fig. 5, thus making sure that the measuring chambers will always be kept filled with lubricant from the source of supply when the units are in their inactive positions. At the outer end of the cylindrical bore is formed a counterbore 111 in which a piston valve block 112 is disposed. The outer end of this counterbore is screw-threaded, and a connector 113 is screw-threaded therein and serves to hold the piston valve block 112 in place. The piston valve block is preferably provided with a valve disc 114 with which the top of the piston engages when it has reached the end of its outward travel. The piston is provided with a longitudinal recess 115 in which is mounted a helical piston spring 116. The outer end of this piston spring is in engagement with the valve disc 114, whereby the piston will be returned to and held in its normal position except when being operated to deliver lubricant to the bearings. Slidably mounted within a centrally arranged bore 120 of the valve block 112 is a piston discharge valve 121. The stem portion 125 of the piston discharge valve extends some distance beyond the valve disc 114 carried by the block 112, so that the valve may have considerable longitudinal movement. The stem portion of the valve is provided with a longitudinal passageway 122 in communication with which are one or more lateral ports 123. These lateral ports are so positioned that they will be closed by the bore 120 of the valve block until the valve has moved longitudinally to the point where they are exposed. Provided on the piston discharge valve is a valve disc 124 which is formed with a tapered face, which engages with a similarly tapered seat formed at the outer end of the bore 120 of the piston valve block 112. As shown in the figures of the drawings, the seat of the valve disc 124 is normally in contact with the seat formed on the piston valve block, so that the passage of lubricant past the piston discharge valve is sealed not only by this angularly formed seat but also by the engagement of the piston valve with the bore 120 of the block. The connector 113 is formed with a bore 130 within which the valve disc 124 is arranged and also with a connecting bore 131 which supports the upper end of a helical valve spring 132. The opposite end of this valve spring is disposed over a guide pin 133 carried by the piston discharge valve, and bears against the valve disc 124, whereby the piston discharge valve is normally held in the position shown in the figures of the drawings. The connector 113 is formed in its outer end with a bore 134 and with a screw-threaded clamping nut 135, whereby the feed pipe 136 may be secured to the connector in the well known manner.

The casing forming the measuring unit 26 is preferably provided with a lateral feed passageway 140 which serves to connect the counterbores 102 of the cylinders. Suitable clamping means 141 are provided at one side of the unit for securely attaching the lower end of the main feed pipe 93 in a manner well known to those skilled in the art. Where the measuring unit 26 shown in the drawings is the only unit on a feed line or where it is the last unit on the feed line, it is provided with means for permitting air to escape from the system. A port 142 is formed in an integral boss 143 and is a continuation of the lateral feed passageway 140 of the unit. The boss 143 is screw-threaded and mounted therein is a bleeder plug 144. This plug is formed with a tapered valve face 145 at its inner end which engages with a coacting valve seat formed at the outer end of the port 142. The plug is provided with a longitudinal passageway 146 and with a lateral passageway 147 which is in communication with the longitudinal passageway. The lateral passageway 147 terminates in a reduced portion of the plug so that when it is unscrewed slightly the air contained in the system will be permitted to pass by the valve face 145, through the lateral passageway 147 and out to the atmosphere through the longitudinal passageway 146.

In Fig. 1, I have shown but one bearing 150 being lubricated with my device, it being obvious that each of the feed pipes 136 shown broken off in the figure are similarly connected to other bearings. The feed pipe is connected to the bearing by means of a connecting element 151 which has a check valve 152 formed therein, whereby lubricant or air which has reached the bearing, will not be permitted to pass from the bearing into the feed pipe.

The form of invention shown in Fig. 6 is a single measuring element and shows a modified form of measuring piston. The cylinder 155 of this form is provided with a bore 156 and with a counterbore 157 near the inner end thereof. A measuring piston 158 is mounted in the cylinder and its diameter is such as to have a close working fit in the bore 156 and so that it will be loosely mounted in the counterbore 157. A bleeder coupling 159 is screw-threaded into the inner end of the cylinder and carries at its outer end a screen 160. The outer end of the coupling is cut away at both sides so as to provide a lateral rib 161, which serves to act as a stop for the outward movement of the measuring piston 158, and also as a support for the screen 160. The supply pipe 162 carries at its outer end a bleeder ferrule 163 which has a loose fit in the opening of the bleeder coupling and which is formed with an annular valve face 164, engageable with a similarly formed valve seat in the coupling. The bleeder is provided near its outer end with a lateral bleeder passageway 165, and a pipe clamping nut 166 is disposed over the pipe 162 and serves to force the annular face 164 of the bleeder ferrule in close contact with the bleeder coupling, thus making a tight joint. In this form of device it is necessary to provide means for removing the air from each of the feed pipes 161 and this is done in this form by loosening the pipe clamping nut 166 which will allow air to pass around the ferrule and past the annular face 164 thereof and to the atmosphere through the passageway 165. This form of the invention is provided with a piston discharge valve 121 as in the form of device shown in Fig. 5, which in this form of invention is slidably mounted within a bore 167 formed in the outer end of the element. The outer end 168 of the element is screw-threaded and directly engageable with the bearing 169. In the outer end 168 of the element there is formed a recess 170 within which the disc 124 of the piston valve and a helical spring 171 are disposed. A valve disc 172 is arranged at the outer end of the bore 156, whereby the measuring piston will be seated when it reaches the outer end of its stroke. This form of the invention is also provided with a helical piston spring 116.

The modification shown in Fig. 8 is similar to that shown in Figs. 6 and 7, except that the cylinder 175 is provided with a bore 176 which is slightly tapered from its outer end and increases in size toward the inner end where the bleeder coupling 159 is located. All the other parts of the structure are the same as those described in connection with Figs. 6 and 7 and are for convenience given the same numbers as the corresponding parts of the forms shown in Figs. 6 and 7.

In Figs. 9, 10, 11, 12, and 13, I show various modifications of the multiple measuring unit shown in Figs. 1, 2, and 5, and for clearance of description, the same numerals as given the form shown in Fig. 5 will be given to the corresponding parts found in these figures.

In the modification of Fig. 9, the cylinder 180 is provided with a bore 181, having a short counterbore 182 near its outer end and with another counterbore 183 at its inner end. Connecting the counterbores 182 and 183 is a spiral groove 184 which is formed in the cylinder. The measuring piston 185 in this form of invention is substantially uniform in diameter throughout and is a close working fit in the bore 181, as well as in that portion of the bore where the groove 184 is formed. The counterbore 182 provides a shoulder 186 for cutting off the lubricant in the counterbore and groove 184 from the bore 181 when the measuring piston is moved on its outward stroke.

In the form of invention shown in Figs. 10 and 11, the cutting off of the communication of the lubricant from the supply line to the cylinder is accomplished by providing the measuring piston 190, which is of uniform diameter, with a flattened portion 191, thus providing a passageway from the counterbore 192 of the cylinder 193 to the bore 194 thereof. The flattened portion 191 extends, of course, over only a portion of the length of the piston and terminates in the shoulder 195, so that when the piston is moved to a point where this shoulder is in registration with the shoulder 196 of the bore, the bore 194 will be sealed by the cylindrical portion 197 of the piston which is a close working fit in the bore 194 of the cylinder.

In the modification shown in Fig. 12, the measuring piston 200 is provided with an enlarged head 201 and a reduced portion 202. A tapered portion 203 is preferably formed between the portions 201 and 202. The cylinder 204 is provided with a bore 205 which is slightly larger than the portion 202 of the piston and with a counterbore 206 near its inner end which is slightly larger than the head 201 of the piston. The head, however, is of such a diameter that it is a close working fit within the bore 205, so that when the piston is moved to the point where the head 201 engages with the bore 205, the bore will be sealed. The bore 205 and counterbore 206 may be connected by a tapered bore 207.

The modification shown in Fig. 13 is similar to that of Fig. 12, except that the cylinder 210 is provided with a bore 211 of substantially uniform diameter throughout. The measuring piston 212 in this form is likewise of substantially uniform diameter throughout. The diameter of the piston is, however, slightly less than the bore 211 so that a restricted passageway for the lubricant is provided.

The form of invention shown in Figs. 14 and 15 is of the single element type in which a ball piston 213 is employed. This ball is mounted within the cylinder 214 of the device which is provided at its inner end with a bore 215, of a diameter to provide a close working fit of the ball therein. The inner end of the cylinder is formed with a counterbore 216 which is slightly larger than the bore 215. A connector 217 is screw-threaded to the outer end 218 of the cylinder, and a screen plate 219 is disposed between the end of the portion 218 and the connector. This plate is provided with a central aperture 220 and with two lateral slots 221 extending radially therefrom as shown in Fig. 15, so that the ball piston 213 when in its normal position as shown in this figure will not close the opening 220. The plate 219 carries a screen 222 whereby the lubricant coming through the said pipe 223 will be screened. This feed pipe is attached to the connector 217 by means of a clamping nut 224, screw-threaded to the inner end of the connector. The outer end of the pipe is preferably a loose fit in the connector and a bleeder opening 225 is provided in the nut, whereby when it is loose, air will be permitted to pass out of the pipe through the opening 225. A port 226 is arranged near the forward end of the cylinder 214 and a seat 227 is formed at the upper end of this port where it communicates with the cylinder bore 215, whereby the piston valve 213 is provided with a seat when it reaches the outer end of its travel. A helical spring 228 is carried by the port 226, so that the ball valve will be pushed off of its seat when it is to be returned to its normal position. A ball check valve 229 is arranged in a port 230 in the portion 231 of the unit and a spring 232 serves to keep the ball upon its seat. The portion 231 is exteriorly screw-threaded as in the forms of device shown in Figs. 6 and 8.

In the form of modification of Fig. 16, I show a pump unit 240 which may be used in connection with an automobile chassis, but which is primarily designed for industrial uses. This unit is provided with a lubricant reservoir 241 which is preferably provided with an attachment pad 242, whereby it may be secured to the machine in connection with which it is to be used. The reservoir is provided with a cover 243, secured in place by means to be hereinafter described. A filler opening 244 is formed in the cover, and a filler cap 245 is screw-threaded into the opening. This cap is provided with a vent 246 and it carries a downwardly extending measuring rod 247. The measuring rod has a notch 248 cut in its periphery, at a point which when reached by the level of the lubricant indicates the need of replenishment of the lubricant.

A lubricant pump 250 is supported centrally through the reservoir. The pump comprises a cylinder 251 formed near its bottom with a flange 252. The cylinder is passed through an aperture 253 formed in the bottom of the reservoir and the flange 252 bears against a lug 254 formed on the bottom of the reservoir. The pump cylinder extends up within the reservoir and its upper end is interiorly screw-threaded for the engagement of a plunger rod guide 255. This guide passes through an aperture 256 in the cover 243, and has its lower end screw-threaded for engagement with the screw-threads formed in the upper end of the pump cylinder. The plunger rod guide is provided with a shoulder 257 which engages with a boss 258 on the cover, and thus serves to hold the pump within the reservoir and the cover tightly in place thereon. A pump plunger rod 260 is slidably supported by the plunger rod guide 255, and it is provided at its lower end with a head 261 having preferably a tapered shoulder 262 for engagement with a tapered seat 263 formed at the lower end of the guide, for sealing the joint between the plunger rod and the guide against the leakage of lubricant when the rod is in its normal position. An operating button 264 is provided at the outer end of the plunger for the engagement of the hand or foot of the operator.

Slidably mounted within the bore 265 of the pump cylinder is a pump plunger 266. This plunger is formed with a central bore 267 within which is mounted a helical spring 268. The upper end of the spring bears against the plunger, and the lower end extends downwardly within the cylinder and is supported upon a screw-threaded plug 269 secured to the lower end of the cylinder and closing the bore 265 thereof. This screw-threaded plug carries an upstanding pin 270 which extends upwardly within the spring and part way within the bore 267 of the plunger, and acts as a guide for the spring and also as a stop for the downward movement of the plunger.

The pump cylinder is provided in its upper portion with lateral passageways 275 which are formed near the plunger head 271. The plunger head is somewhat reduced in diameter so that a channel 276 is formed between it and the bore 267 of the cylinder, whereby an oil ring will be formed which will seal the joint between the plunger and the cylinder at all times. The cylinder is provided near its lower end with lateral supply ports 277 which connect the interior of the cylinder at a point below the bottom end of the plunger with the interior of the reservoir 241. A screen 278 is supported by this cylinder opposite these ports, and is preferably carried in interspaced relation with the cylinder by means of the flange 279 and the portion 280 of the cylinder.

Formed at the extreme lower end of the pump cylinder is a laterally extending boss 281 which is provided with a passageway 282 which communicates with the bore 267 of the cylinder. The supply pipe 283 is connected to the boss preferably by means of the nut 284.

The form of pump shown in Fig. 17 is designed to be used in connection with a separate lubricant tank (not shown) from which a supply line 290 is extended. The pump comprises a cylinder 291 in which is slidably mounted a pump plunger 292. The plunger is provided with a central bore 293 and with a solid head 294. The upper end of the cylinder is closed by means of a plunger rod guide 295 which is suitably supported through an aperture 296 in the floor board 297 of the automobile. This rod guide is provided with a stuffing box 298 and with a stuffing box gland 299. A plunger rod 300 is slidably mounted in the rod guide and is provided at its upper end with an operating button 301. A head 302 is formed at the lower end of the rod and an angular face 303 joins the head with the body of the rod and forms a valve at the lower end of the guide for engagement with an angular seat 304 formed on the guide.

The upper end of the cylinder is provided with a boss 305 to which a supply pipe connector 306 is attached. The supply line 290 is carried by the connector and secured thereto by means of the nut 307. The passageway 308 of the connector communicates with the passageway 309 in the cylinder and thus conducts lubricant to the enlarged bore 310 formed in the upper end of the cylinder. The plunger head 294 is provided with a plurality of lateral passageways 311 which communicate with a central passageway 312. This passageway terminates at the upper end of the bore 293 of the plunger. The enlarged bore 310 of the cylinder extends down to the bottom of the lateral passageways 311 when the piston is in its normal position as shown in Fig. 17, so that the bottom of the cylinder and bore of the plunger will be normally kept filled with lubricant, such supply of lubricant being cut off after the plunger has been moved downwardly to a point where the lateral ports 311 will be closed by the bore 313 of the cylinder.

A feed pipe coupling 315 is carried at the lower end of the cylinder 291 and it is provided with centrally arranged ports 316 and 317. The lower end of the port 317 is preferably closed by means of a screw-threaded plug 318. The connector is preferably provided with two or more laterally arranged bosses 319, each of which is formed with a passageway 320 for supporting the feed pipes 321 and for the communication of lubricant from the passageway 317 to these pipes. An upstanding rod 322 is carried by the connector 315 for supporting a helical spring 323 which is mounted within the cylinder and the bore of the plunger and has its upper end engageable with the plunger, for keeping the same in its normal position.

When the device shown in Figs. 1 to 5 is to be put into operation, the lubricant container 35 is filled with lubricant. This lubricant will now flow down into the casing 31. The operating plunger 60 is now actuated by the hand or foot of the operator and is pushed in to the limit of its travel, or until the latch 74 engages with the latch lug 75 carried by the rod. This inward movement of the plunger serves to actuate the cross-head 50, and to compress the spring 55. During this movement the plunger 87 has been moved out of the cylinder 85, so that the lateral ports 89 thereof are exposed to the lubricant contained within the casing. The lubricant will now fill the cylinder 85 through the ports 89 and will flow to the main supply pipe 93, filling this pipe and the passageway 140 of the measuring unit 26. The lubricant will flow from this passageway to each of the elements of the unit, where it will find its way around the piston and into the cylinder of each of the measuring elements and thus fill the system up to the piston discharge valves 121. The release trigger 70 is now operated, and the plunger 60, cross-head 50, and pump plunger 87 will be operated in a forward direction by the helical spring 55. As the plunger moves a relatively short distance, the openings 89 are cut off from communication with the lubricant in the casing, and the pump then serves to force the lubricant out of the cylinder 85 under pressure, through the parts which are previously filled with oil, as above described, thus causing the piston 105 of each of the measuring elements to be moved outwardly within the bore 101 of its cylinder. A slight movement of the piston will bring the shoulder 109 within the bore of the cylinder and thus cut off the further supply of lubricant to the cylinder from the pressure side of the system. Before, however, the piston has moved a distance sufficient to cut off this supply, the pressure of the lubricant will be exerted upon the piston discharge valve 121 and will force it longitudinally within the block 112 until the lateral port 123 has reached the end of the piston valve block where it will open into the port 130 of the connector 113, thus allowing oil to flow into the feed pipe 136. Further movement of the piston by the pressure of the lubricant exerted on the head thereof at the point in its movement where the lubricant is cut off will serve to force a definite, measured amount of lubricant into the feed pipe. The device will of course have to be operated as above described until all of the feed pipes up to the check valves 152 of the connecting elements 151 are filled solidly with lubricant. Air contained in the cylinders of the elements and in the feed pipes 136 and connected passageways will be conducted out through the bearings, but air in the main supply pipe and the passageway 140 of the measuring unit will be forced out through the bleeder plug 144, which is slightly unscrewed during the initial priming operation of the device. This is left open until all the air has been forced out of that part of the system and lubricant leaks from the plug. It is then tightly closed and is not again used unless the system is disassembled. It will be clear from the foregoing that after the system has once been primed a definite amount of lubricant, measured if desired in drops, will be forced out of each connecting element 151 and fed to the bearings, depending upon the length of the piston of each measuring element and the amount of stroke thereof.

After the release trigger 70 has been operated, the operator need pay no further attention to the system, since the plunger 87 will be stopped when all of the pistons of the measuring elements have been operated to the point where they cut off the communication of each cylinder with the lubricant. Leakage of the lubricant past the pistons of the measuring elements will be prevented because each of the pistons at the end of its stroke comes in contact with the valve disc 114 carried by the cylinder and thus cutting off any leakage past this joint. When the device is again to be used, the plunger is forced inwardly until it is again latched. When this is done, the piston plunger 87 will, of course, be partially withdrawn from the cylinder and will thus relieve the pressure on the heads of the pistons of the measuring elements allowing them to return under spring pressure to their normal positions. Since, however, a definite amount of lubricant has been forced out of this part of the system, there will be a partial vacuum created which must, of course, be relieved by a replenishment of the lubricant. It will be clear that when the pistons of the measuring elements have seated themselves on the valve discs 114, that the pressure upon the piston discharge valve 121 will be released, and this valve will be returned to its normal position by means of its spring 132. Since the piston discharge valve is seated, no lubricant can be drawn from the feed pipes 136 to replenish the lubricant in the other part of the system. Just as soon, however, as the shoulder 109 of the piston passes out of the bore 100 of the cylinder, lubricant will be permitted to flow around the spiral groove 106 in the piston, thus allowing the lubricant which is now under no pressure to flow into the cylinder and replenish that which has been previously forced out through the feed pipe during the preceding operation. It will be obvious, therefore, that no part of the system is ever exposed to the atmosphere and that because it is solidly filled with lubricant, the amount of lubricant discharged at each operation of the pistons of the measuring elements may be predetermined with great accuracy.

When the level of the lubricant in the lubricant container 35 reaches the bottom of the strainer 43 or the point indicated by the dotted line, it is time to replenish the lubricant. This point may be observed through the screen 43. It is clear that the device may be operated for some time after this point has been reached, but it is essential for the successful operation of the device that no air shall reach the pump cylinder 85 or associated parts, and thus be forced into the system. It will be observed that the pump cylinder is at the lowest point in the casing 31, so that the greatest possible factor of safety is had should one neglect to replenish the lubricant in the lubricant container.

The operation of the piston discharge valve 121 in all the other forms of measuring elements shown in Figs. 6 to 13, inclusive, is the same as that described in connection with Fig. 5. The operation of the measuring pistons in each of the devices of these figures is similar, except that the fluid is cut off (except in the form of Fig. 13) by various means. In Fig. 6 when the measuring piston 158 enters the bore 156 of the cylinder, further supply of lubricant to the cylinder in front of the piston will be cut off. In Fig. 8, where the cylinder bore 176 is tapered, forward movement of the measuring piston 158 will gradually cut off the supply of lubricant to the outer end of the cylinder.

The operation of the form of Fig. 9 is such that when the piston is moved forwardly it will cut off the supply of lubricant coming through the spiral groove 184 when it reaches the shoulder 186 of the counterbore 182. In Fig. 10, when the shoulder 195 formed by the flattened surface 191 of the piston reaches the shoulder 196 of the cylinder, the supply of lubricant will be cut off since the cylindrical part 197 of the piston has a working fit within the cylinder bore 194. When the piston 202 of the form of device shown in Fig. 12 is moved forwardly by the pressure of the lubricant, the engagement of the head 201 thereof with the bore 205 of the cylinder will cut off the supply of lubricant. In the form of device shown in Fig. 13, the cylinder bore and piston both have a substantially uniform diameter, the piston being slightly smaller in diameter than the cylinder bore, whereby the clearance between them provides a passage for the lubricant.

The above referred to clearances, provided by the spiral groove of the piston of Fig. 5; the increased diameter of the bore of Fig. 6; the tapered bore of Fig. 7; the spiral grooved bore of Fig. 8; the flat port of Fig. 10; the reduced diametrical piston portion of Fig. 12; and the enlarged cylindrical bore of Fig. 13 are such that when pressure is applied to the outer end of the piston, the piston will be operated since such clearances act simply as leakage ports and offer sufficient resistance so that the necessary pressure is built up behind the pistons to operate the same. These clearances are, however, sufficient to allow the lubricant to slowly leak past the piston when it has returned to its normal inoperative position thus providing a long restricted passageway, whereby the lubricant in the forward end of the cylinder is replenished. It will be further noted that each of the pistons in the several figures last above referred to is characterized by having a length which is greater than its diameter, whereby the long restricted passageway, above referred to, is provided, so that changing viscosity of the lubricant will not readily affect the accuracy of the measuring element.

When using the form of device of Fig. 14, the lubricant under pressure coming through the pipe 223 will force the ball piston 213 into the bore 215 of the cylinder, and since this ball is of a diameter to have a working fit within the cylinder, an additional supply of lubricant will be cut off from the cylinder. The outward movement of the ball will, of course, unseat the check valve 229 and permit a measured amount of lubricant contained within the cylinder to be discharged through the port 230 to the bearing. When the ball piston 213 is returned to its normal position, it will again enter the counterbore 216 and thus permit lubricant coming from the pipe 223 to pass around it and replenish the lubricant in the cylinder.

All the measuring elements shown in Figs. 6, 8, and 14 are, as hereinbefore described, designed to be attached directly to the bearings to be lubricated. Each of them is, therefore, attached at the end of the main supply line, and, therefore, the air in the system when initially installed is relieved by the bleeder openings provided in the forms of these figures. In Figs. 6 and 8, the clamping nut 166 is loosened which will permit the air to pass over the loose joint between the ferrule 156 and the bleeder coupling 159 and reach the opening 65, whence it will pass into the atmosphere. In the form of Fig. 14, the clamping nut 224 is loosened, thus allowing the air to pass around the outer end of the pipe 223 and reach the bleeder opening 225. When all the air has passed out of the system through the bleeder openings and the lubricant starts to flow therefrom, the openings are closed by tightening the parts.

When but one of the measuring elements of the type shown in Figs. 6, 8, and 14 is to be employed, it will be connected to the end of the main supply pipe 93. However, there are a number of these elements used in my lubricating system and it is obvious that such measuring elements are connected to the main supply pipe by suitable T-fittings, well known to those skilled in the art and not shown in the drawings for clearness of illustration.

As hereinbefore stated the form of invention shown in Fig. 16 is designed primarily for industrial uses, and when this modification is to be put into operation, the reservoir 241 is filled with lubricant through the filler opening 244. This lubricant will pass through the screen 278, through the lateral openings 277, and into the cylinder bore 265. It will flow to the bottom of the bore and out through the port 282 and into and through the pipe 283 up to the measuring elements, or as far as the air contained in the units or pipe will permit. Lubricant will also flow through the lateral ports 275 and will fill the channel 276 thus sealing the joint between the cylinder and piston. It will be clear that when the plunger rod 260 is depressed that it will immediately cut off the lateral passageways 277, and will thereafter force the lubricant from the cylinder under pressure. It will, of course be necessary when initially installing this modification to operate it a number of times using the bleeder openings of the measuring units or elements to expel all air from the system.

In the form of invention shown in Fig. 17, the pumping unit is designed to be used in connection with a separate lubricant receptacle to which it is always connected by means of the pipe 290. Lubricant will, therefore, flow into the cylinder through the passageway 309 and enter the counterbore 310 of the cylinder. It will flow through the lateral passageways 311 of the plunger and enter the cylinder bore 313 and the plunger bore 293 through the passageway 312. The lubricant will flow from the lower end of the cylinder into the passageways 316 and 317 of the connector 315 and into the feed pipes 321, whence it will be conducted to the measuring units or elements employed in the system. When the plunger in this form is depressed by the plunger rod 300, the lateral ports 311 formed in the plunger will be immediately cut off by the entrance of that portion of the plunger into the cylinder bore 313. This will cut off further supply of lubricant to the cylinder, and the lubricant in the cylinder will thus be forced under pressure to the measuring units or elements.

While I have shown and described the piston discharge valve as having a longitudinal and lateral port formed in its stem portion, whereby a seal or seat is provided for the valve between it and the bore of the piston valve block, it is obvious that similar results may be obtained by providing flutes in the stem portion of the valve or flattened portions thereon, the flutes or flattened portions preferably terminating at substantially the same point in the length of the valve as the point where the lateral passageway is formed in the form of device shown and described.

In the foregoing description I have described the trigger as being released only by the foot of the operator, but, if desired, I may provide automatic means for periodically operating the trigger at regular intervals of travel of the car. In providing for the automatic operation of the trigger, a solenoid may be provided for operating the trigger and be connected to the source of electric current of the car. The odometer of the car may be provided with electrical contacts so designed that the solenoid would be operated and the trigger released at the desired periods of travel of the car. When such an automatic means is employed, it is desirable to have the electric contacts of the odometer so proportioned that the plunger will have sufficient time to thoroughly lubricate the automobile even in the coldest weather. Moreover, if desired, means may be provided for temporarily locking the plunger after it has been released so that it can not be retracted by the foot of the operator until a suitable period of time has elapsed after its release to insure the supply of lubricant to the various measuring valves. The solenoid may be so arranged as to make an audible sound such as a click or the like so that the operator will know that the car is being lubricated. When my automatic means are employed, it is desirable to have the pump unit so positioned that the operating button of the plunger will extend out over the foot pedal of the car so as to attract the attention of the operator, and remind him of the necessity of pushing the plunger in to relatch it in its operative position.

These and other modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A measuring element for connection in a pressure lubricating system, comprising a cylinder, a piston slidably mounted in the cylinder, and an independently operated piston discharge valve slidably mounted for closing one end of the cylinder and formed with a stem portion, such stem portion being formed with a longitudinal passageway in communication with the cylinder, and a lateral passageway connected with the longitudinal passageway and in communication with the bearing being lubricated when the valve is moved from its seat.

2. A measuring element for connection in a pressure lubricating system, comprising a cylinder, a piston slidably mounted in the cylinder and controlling the flow of lubricant thereto, the cylinder being formed with a centrally arranged reduced bore, and a piston discharge valve separate from the piston and provided with a stem which is always slidably engaged with the reduced bore for shutting off the bore when it is in its normal position.

3. A measuring element for connection in a pressure lubricating system, comprising a cylinder, a piston slidably mounted in the cylinder, the cylinder being formed with a centrally arranged bore, an independently operated piston discharge valve provided with a stem portion which is always slidably mounted within the reduced bore, such stem being formed with a longitudinal passageway in communication with the cylinder and a lateral passageway connected with the longitudinal passageway and in open communication with the bearing being lubricated when the valve is moved from its seat.

4. A measuring element for connection in a pressure lubricating system, comprising a cylinder, a piston slidably mounted in the cylinder, a piston valve block mounted at the discharge end of the cylinder and formed with a longitudinal bore, and a piston discharge valve slidably mounted within the longitudinal bore of the block and formed with a longitudinal passageway in communication with the cylinder and with a lateral passageway communicating with the longitudinal passageway, the lateral passageway being formed at a point where it will be closed by the bore of the block when in its normal position.

5. The combination with a part to be lubricated and a source of lubricant supply, of a measuring element including a normally open lubricant measuring chamber, said chamber being provided with an inlet, slidable means operable to close said chamber to the lubricant supply, the measuring chamber and closing means being so proportioned that a long, restricted passageway will be formed there-between for establishing communication between the open chamber and the inlet, and other means structurally independent of the first mentioned means and operated by the lubricant pressure to open communication between said chamber and the part to be lubricated.

6. The combination with a part to be lubricated and a source of lubricant supply, of a measuring element including a normally open lubricant measuring chamber having an inlet from the source of lubricant supply, a piston having a length greater than its diameter slidably mounted in the chamber and so designed as to cut off the flow of lubricant to the chamber after a short initial movement, and a piston discharge valve structurally independent of the piston and slidably mounted for closing one end of the chamber, said discharge valve being formed near its outlet end with a valve face, the body portion thereof near such outlet end being so mounted as to be fluid tight whereby the passage of lubricant from the chamber is cut off.

7. The combination with a part to be lubricated and a source of lubricant supply, of a measuring element including a normally open lubricant measuring chamber, slidable means operable to close said chamber to the lubricant supply, the measuring chamber and closing means being so proportioned that a long restricted passageway will be formed there-between, other means operable independently of the first mentioned means and by the lubricant pressure to open communication between said chamber and the part to be lubricated, a pump unit, a supply pipe between the pump unit and the measuring element, the pump being in communication with the lubricant supply, and piston means provided in the pump unit for sealing the column of lubricant in the supply pipe against pressure of fluid in the lubricant supply and for freely lifting such column during the return stroke of the measuring element, such piston means being so formed that the pump unit and the supply pipe will be brought into communication with the lubricant supply when the piston means is moved to its normal position.

8. The combination with a part to be lubricated and a source of lubricant supply, of a measuring element including a normally open lubricant measuring chamber, a piston having a length greater than its diameter slidably mounted in the chamber and so designed as to cut off the flow of lubricant to the chamber after a short initial movement, a piston discharge valve operable independently of the piston and slidably mounted for closing one end of the chamber, said discharge valve being formed near its outlet end with a valve face, the body portion thereof near such outlet end being so mounted as to be fluid tight whereby the passage of lubricant from the chamber is cut off, a pump unit, a supply pipe between the pump unit and the measuring element, the pump being in communication with the lubricant supply, and piston means provided in the pump unit for sealing the column of lubricant in the supply pipe against pressure of fluid in the lubricant supply and for freely lifting such column during the return stroke of the measuring element, such piston means being so formed that the pump unit and the supply pipe will be brought into communication with the lubricant supply when the piston means is moved to its normal position.

CHARLES W. MANZEL.